United States Patent
Yoshii

(10) Patent No.: US 6,686,982 B1
(45) Date of Patent: Feb. 3, 2004

(54) REFLECTION TYPE LIQUID CRYSTAL DISPLAY DEVICE IN WHICH OBLIQUE MOIRÉ FRINGE IS NOT EASILY VIEWED AND WHICH IS SUPERIOR IN DISPLAY QUALITY

(75) Inventor: Katsumasa Yoshii, Fukushima-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/548,090

(22) Filed: Apr. 12, 2000

(30) Foreign Application Priority Data

Apr. 13, 1999 (JP) .......................................... 11-105868

(51) Int. Cl.[7] .......................................... G02F 1/1335
(52) U.S. Cl. ....................................... 349/113; 349/106
(58) Field of Search ............................... 349/113, 112, 349/106

(56) References Cited

U.S. PATENT DOCUMENTS

| | | | |
|---|---|---|---|
| 3,977,767 A | * 8/1976 | Okuma et al. ............... | 350/160 |
| 4,298,249 A | * 11/1981 | Gloor et al. ................. | 349/112 |
| 5,841,496 A | 11/1998 | Itoh et al. | |
| 6,130,736 A | * 10/2000 | Sasaki et al. ................ | 349/122 |
| 6,151,089 A | * 11/2000 | Yang et al. .................. | 349/113 |

* cited by examiner

Primary Examiner—Tarifur R. Chowdhury
Assistant Examiner—Dung Nguyen
(74) Attorney, Agent, or Firm—Brinks Hofer Gilson & Lione

(57) ABSTRACT

A liquid crystal display device using a reflection plate having a repeated configuration is disclosed in which the viewable oblique moiré fringe is decreased. The reflection type liquid crystal display device includes a pair of substrates, a liquid crystal layer placed between the pair of substrates, a plurality of transparent electrodes formed in parallel at predetermined intervals on opposing surfaces of the pair of substrates, the opposed transparent electrodes being orthogonal to each other, and a reflection member provided on the side of one of the opposing surfaces of the substrates or on the outside. The reflection member has a plurality of recesses continuously formed and arranged in two orthogonal directions. The orthogonal directions in which the recesses are arranged deviate about 2.5 to about 40 degrees from the orthogonal directions in which the orthogonal transparent electrodes extend.

10 Claims, 10 Drawing Sheets

REFLECTION TYPE LIQUID CRYSTAL DISPLAY DEVICE IN WHICH OBLIQUE MOIRÉ FRINGE IS NOT EASILY VIEWED AND WHICH IS SUPERIOR IN DISPLAY QUALITY

BACKGROUND OF THE INVENTION

1. Field of the Invention

The present invention relates to a liquid crystal display device and, in particular, to a reflection type liquid crystal display device which effects display by using external light.

2. Description of the Related Art

Recently, the demand for longer operational life in portable information apparatuses such as notebook PCs and electronic notebooks when connected to a portable power supply (e.g. a battery) has increased. Mechanisms that lead to this longer operational life include an increase in battery capacity and a decrease in power consumption of the apparatus. The display in a portable information apparatus is one of the devices that uses a large amount of power. Thus, to lower the amount of power used, it is useful to decrease the amount of power consumed in displaying information to the user. For this reason, devices using liquid crystal displays (or liquid crystal display devices) are widely used as low power consumption displays. In general, conventional liquid crystal display devices use backlighting to aid in displaying data. However, the use of backlighting consumes power. Thus, a reflection type liquid crystal display device, which does not use a backlight is effective in achieving a reduction in power consumption.

As shown in FIG. 10, a conventional reflection type display device 100 comprises a pair of glass substrates 113 and 114, transparent electrode layers 120 and 121 respectfully provided on the opposing (inside) surfaces of the glass substrates 113 and 114, liquid crystal orientation films 122 and 123 respectively provided on the transparent electrode layers 120 and 121, and a liquid crystal layer 115 provided between the orientation films 122 and 123. First and second polarizing plates 117 and 118 are respectfully provided on the other surfaces (outside) of the glass substrates 113 and 114. A reflection plate 101 is provided on the outside of the second polarizing plate 118. The surface of a reflection film 105 on the reflection plate 101 is disposed between the reflection plate 101 and the second polarizing plate 118. Note that the terms inside (or inner side) and outside (or outer side) have been used here to denote sides of layers more proximate and more distal, respectfully, to the liquid crystal layer 115.

In the reflection type liquid crystal display device 100 described above, light impinging upon the first polarizing plate 117 undergoes linear polarization, and is further transmitted through the liquid crystal layer 115 to become elliptically polarized. The second polarizing plate 118 changes the elliptically polarized light into linearly polarized light, the reflection plate 101 reflects the linearly polarized light, which is subsequently transmitted through the second polarizing plate 118 and the liquid crystal layer 115 and emitted from the first polarizing plate 117.

In the conventional reflection type liquid crystal display device described above, the reflection plate 101 is endowed with scattering reflection characteristics by, for example, forming a reflection layer consisting of aluminum or the like on the rough surface of a metal film, synthetic paper or the like.

One problem with the typical reflection plate described above is that it has wide scattering angle characteristics, which is to say that it is difficult to enhance the brightness in a particular, frequently viewed direction (as in the case of the front of the display surface as viewed by the user). As a result, although the angle of sight is wide, the display is rather dark.

Alternatively, a flat, mirror-like surface may be used as the reflection surface rather than the rough reflection surface described above. When a mirror surface is used as the reflection surface, it is possible to obtain very bright characteristics in the specular direction with respect to the incident light. However, a disadvantage of using a mirror surface as the reflection surface is that when viewing the display from a direction that deviates slightly from the specular direction, the display is dark.

Thus, ideal reflection plate characteristics include both a wide viewing angle and high brightness. In view of this, effective scattering reflection in the viewing direction is desirable. A mechanism for achieving these characteristics is using a reflection plate having an intentionally controlled reflection scattering angle. It is also desirable for the arrangement to be random to avoid coloring due to the interference of the reflection light.

To control the reflection scattering angle, it may be possible to use machining or the like to form controlled, minute protrusions and recesses. However, when a completely random arrangement is adopted, the coordinate data on the work points is enormous and is impractical to create this type of reflection plate. Alternatively, it may be possible to generate random coordinates each time machining is conducted. In this case, however, it would be difficult to control the reflection scattering angle.

In addition, as a practical matter, it is easier from the viewpoint of designing and machining to form a random arrangement in a small-scale region and repeat the arrangement. In a possible example, recesses (or protrusions) are sequentially mechanically formed on the surface. It is convenient to form either one shape or a plurality of shapes at one time in a certain place on the surface and subsequently feed the surface sequentially in the X-direction in a fixed pitch, feed the machining position in the Y-direction after machining for a predetermined length, and perform surface processing while again feeding in the X-direction. This machining method results in a structure having a repeated arrangement in the machining feeding direction.

Using a reflection plate having a repeated arrangement (either formed by this or other methods) and combining with a stripe-shaped electrode as a display electrode may result in periodic overlapping between the patterns if the directions of the repeated structures do not completely coincide but are slightly angled with respect to each other. This periodical overlapping creates a fringe-like pattern, which is oblique with respect to the pattern direction, and results in a so-called moiré fringe being viewed. Even if a reflection type liquid crystal display device of this type is combined with color filters to perform color display, a moiré fringe is viewed due to the repeated structure of the protrusions and recesses of the reflection plate and the repeated alignment structure of the colored pixels of the color filters. The moiré fringe created impairs the display quality.

SUMMARY OF THE INVENTION

The present invention has been made with a view toward solving the above problem. It is an object of the present invention to provide a liquid crystal display device having a decreased viewable oblique moiré fringe while using a reflection plate having satisfactory reflection characteristics with a repeated recess arrangement and which is superior in display quality.

In accordance with the present invention, there is provided a reflection type liquid crystal display device comprising upper and lower substrates, a liquid crystal layer provided between the upper and lower substrates, a plurality of transparent electrodes formed on the side of at least one of the opposed surfaces of the upper and lower substrates so as to extend in a predetermined direction, and a reflection member on the opposed surface side or outside of the lower substrate, the reflection member having a plurality of recesses arranged in a direction, wherein the direction in which the recesses are arranged is deviated about 2.5 to about 40 degrees from the direction in which the transparent electrodes extend, thereby decreasing the viewable moiré fringe and improving the display quality of the liquid crystal display device.

Further, in accordance with the present invention, there is provided a reflection type liquid crystal display device, wherein the reflection member has on its surface a plurality of recesses the inner surfaces of which constitute part of spherical surfaces and which are formed continuously so as to overlap each other, the depth of the recesses and the pitch of adjacent recesses varying within predetermined ranges, whereby it is possible to obtain a bright reflection plate free from interference of light, thereby making it possible to improve the display quality of the liquid crystal display device.

Further, in accordance with the present invention, there is provided a reflection type liquid crystal display device which adopts an STN or TFT system wherein the reflection member is provided on the liquid crystal layer side of the lower substrate and wherein a polarizing plate is provided on the upper substrate.

Furthermore, in accordance with the present invention, there is provided a reflection type liquid crystal display device comprising a pair of substrates, a liquid crystal layer placed between the pair of substrates, a plurality of transparent electrodes formed in parallel at predetermined intervals on opposed surfaces of the pair of substrates, the opposed transparent electrodes being orthogonal to each other, and a reflection member provided on the side of one of the opposed surfaces of the substrates or on the outside, the reflection member having a plurality of recesses continuously formed so as to be arranged in two directions orthogonal to each other, the two directions in which the plurality of recesses are arranged are deviated by an angle of about 2.5 to about 40 degrees from the two directions in which the transparent electrodes orthogonal to each other extend.

In this reflection type display device, the moiré fringe interval is small, thereby decreasing the viewable moiré fringe and improving the display quality of a liquid crystal display device.

In the present invention, minute protrusions and recesses are formed on the surface of the reflection member, and the protrusions and recesses are repeatedly arranged according to a fixed regulation.

In the present invention, a preferable reflection member has a plurality of recesses continuously formed on the surface whose inner surface constitutes a part of a spherical surface, the depth of the recesses being in the range of 0.1 to 3 µm, the inclination angle distribution of the recess inner surface being in the range of −35 degrees to +35 degrees, the pitch of adjacent recesses being in the range of 5 µm to 50 µm.

The "recess depth" is the distance from the surface of the reflection member to the bottom of the recess, and the "pitch of the adjacent recesses" is the distance between the centers of the recesses, which are circular in plan view. Further, the "inclination angle of the recess inner surface" is the angle of the inclined surface with respect to the horizontal surface in the minute range when a minute range of 0.5 µm width is taken at an arbitrary position on the inner surface of the recess 4. It is assumed that the angle of the reflection inclined surface of each recess with respect to a normal extending from the reflection member surface is positive and that the angle of the opposed inclined surface is negative.

In this preferable reflection member, it is important that the inclination angle distribution is set in the range of −35 degrees to +35 degrees and that the recess pitch is arranged random with respect to all directions of the plane. If there should be any regularity in pitch in adjacent recesses, the interference colors of light would appear, coloring the reflection light. If the inclination angle distribution of the recess inner surface is beyond the range of −35 degrees to +35 degrees, the inclination angle of the reflection light is too wide, and the reflection intensity deteriorates, making it impossible to obtain a bright reflection plate (The diffusion angle of the reflection light is over 70 degrees in the air, resulting in a reduction in the reflection intensity peak in the interior of the liquid crystal display device and an increase in total reflection loss.

Further, when the recess depth is more than 3 µm, the vortex of the protrusion cannot be buried in the flattening film when flattening the recesses in the post process, making it impossible to achieve a desired flatness.

When the pitch of the adjacent recesses is less than 5 µm, there is a limitation to the preparation of the mould for forming the reflection member, and a configuration which would provide desired reflection characteristics cannot be obtained, interference light, etc. being generated. In fact, when a diamond indenter having a diameter of 30 to 100 µm that can be used for the preparation of the mould for forming the reflection member is used, it is desirable for the pitch of the adjacent recesses to be 5 to 50 µm.

It is desirable for the pitch of stripe-like transparent electrodes arranged side by side to be 50 to 500 µm. Further, it is desirable for each line width to be 40 to 490 µm.

If the pitch of the transparent electrodes arranged side by side is less than 50 µm, there is a limitation to the machining of the transparent electrodes; if it is more than 500 µm, the pixels become rather large, making it impossible to obtain desired display characteristics and display quality.

Further, if the line width between the electrodes is less than 40 µm, there is a limitation to the machining of the transparent electrodes; if it is more than 490 µm, the pixels become large, making it impossible to obtain desired display characteristics and display quality.

In the reflection member, the two orthogonal directions in which a plurality of protrusions and recesses are arranged are deviated about 2.5 to about 40 degrees from the two directions in which the orthogonal electrodes extend since, if the deviation is less than about 2.5 degrees, moiré fringe that can be viewed will be generated and, if it is more than about 40 degrees, another moiré fringe that can be viewed will be generated.

Further, in accordance with the present invention, there is provided a reflection type liquid crystal display device comprising upper and lower substrates, a liquid crystal layer provided between the upper and lower substrates, a plurality of transparent electrodes formed on at least one opposed surface side of the upper and lower substrates so as to extend in a predetermined direction, a reflection member provided on the opposed surface side or outside of the lower substrate, and color filters provided on one of the opposed sides of the upper and lower substrates, the reflection member having a plurality of recesses arranged in a direction, wherein the direction in which the recesses are arranged is deviated about 2.5 to about 40 degrees from the direction in which a plurality of colored pixels of the color filters are aligned, thereby decreasing the viewable moiré fringe and improving the color display quality.

Further, in accordance with the present invention, there is provided a reflection type liquid crystal display device wherein the reflection member has a plurality of recesses the inner surfaces of which constitute part of spherical surfaces, the depth of the recesses and the pitch of the recesses varying within predetermined ranges, whereby it is possible to obtain a bright reflection plate free from interference of light, making it possible to achieve an improvement in color display quality.

Furthermore, in accordance with the present invention, there is provided a reflection type color liquid crystal display device which adopts an STN or TFT system wherein the reflection member is provided on the liquid crystal layer side of the lower substrate and wherein the color filters or overcoat layer is sequentially provided on the reflection member, a polarizing plate being arranged on the upper substrate.

Furthermore, in accordance with the present invention, there is provided a reflection type color liquid crystal display device comprising a pair of substrates, a liquid crystal layer placed between the pair of substrates, a plurality of transparent electrodes formed in parallel at predetermined intervals on opposed surfaces of the pair of substrates, the opposed transparent electrodes being orthogonal to each other, a reflection member provided on the side of one of the opposed surfaces of the substrates or on the outside, and color filters provided on the side of one of the opposed surfaces of the substrates, the reflection member having a plurality of recesses continuously formed so as to be arranged in two directions orthogonal to each other, the two directions in which the plurality of recesses are arranged are deviated by an angle of about 2.5 to about 40 degrees from the two directions in which the transparent electrodes orthogonal to each other extend, the two directions in which a plurality of colored pixels of the color filters are aligned are identical with the two directions in which the electrodes orthogonal to each other extend.

In this reflection type color liquid crystal display device, the moiré fringe can be reduced to such a degree that it is hard to view, and the reflection member provides a high reflection efficiency in all directions, so that, compared with the conventional reflection type color liquid crystal display device, it is possible to provide a reflection type color display device which is brighter and which has more satisfactory display quality.

As the above reflection member and electrodes, it is possible to use the reflection member and electrodes in the above-described reflection type liquid crystal display device.

In the color filters, it is desirable to arrange a plurality of colored pixels in parallel in rows at an inter-row pitch of 50 to 500 μm, and the row width of each colored a pixel row is preferably 40 to 490 μm. If the inter-row pitch of the colored pixel rows arranged in parallel is less than 50 μm, there is a limitation to the processing of the colored pixel rows; if it is more than 500 μm, the pixels become rather large, making it impossible to achieve desired display characteristics and display quality.

Further, if the row width of each colored pixel row is less than 40 μm, there is a limitation to the processing of the colored pixel rows; if it is more than 490 μm, the pixels become rather large, making it impossible to achieve desired display characteristics and display quality.

DESCRIPTION OF THE PREFERRED EMBODIMENT

A first embodiment of the present invention will now be described with reference to the drawings.

Figure 1:
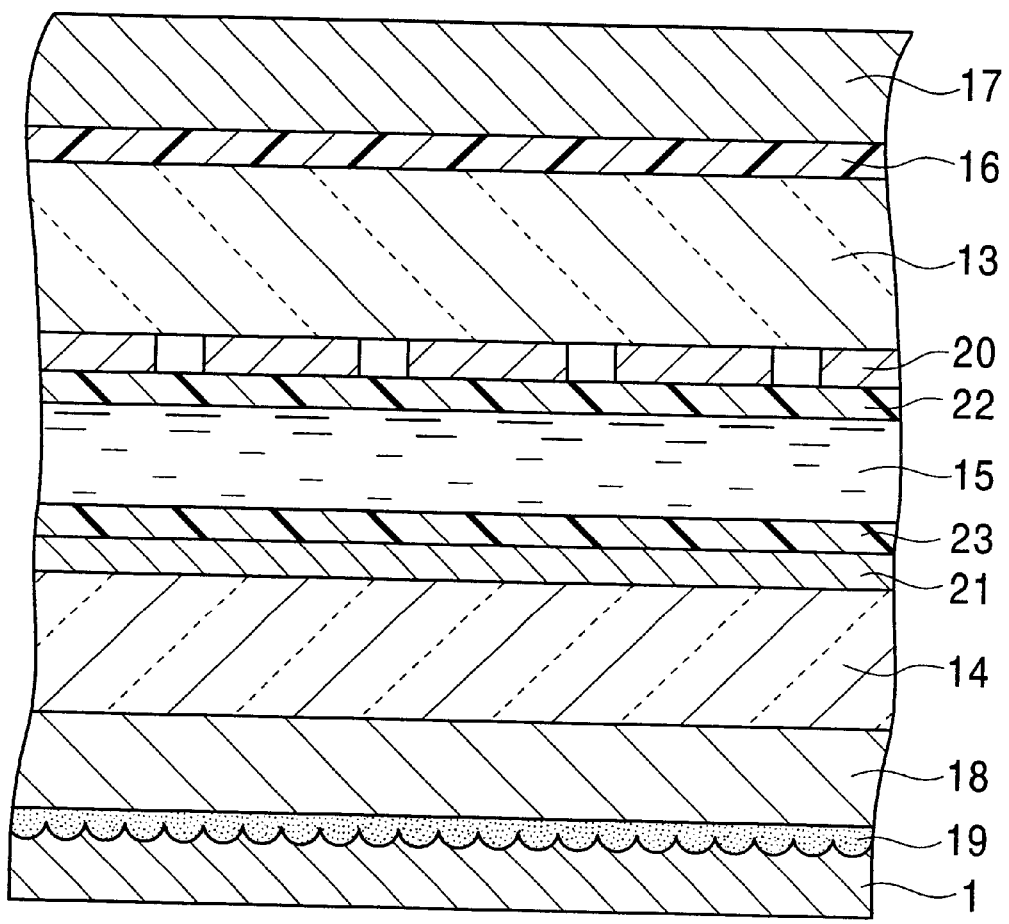
FIG. 1 is a sectional view of a reflection type liquid crystal display device according to an embodiment of the present invention.

FIG. 1 is a sectional view showing a first embodiment of the reflection type liquid crystal display device of the present invention. This reflection type liquid crystal display device includes a display side glass substrate 13 and a backside lower glass substrate 14 having a thickness of, for example, 0.7 mm. A plurality of transparent display electrodes 20 and 21 are formed on the inner side of these glass substrates. The plurality of lower transparent electrodes 21 extend laterally in FIG. 1 and are arranged side by side at a first set of fixed intervals. The plurality of upper transparent electrodes 20 extend in a direction passing through the plane of FIG. 1 and are arranged side by side at a second set of fixed intervals. Liquid crystal orientation films 22 and 23 respectively provided on the transparent electrode layers 20 and 21. Thus, the stripe-like electrodes illustrated have a length extending in a longitudinal direction and a width.

A liquid crystal layer 15 is provided between these electrodes. A phase plate 16 consisting of polycarbonate resin or polyacrylate resin or the like is provided on the outer side of the display side glass substrate 13. A first polarizing plate 17 is arranged on the outside of the phase plate 16. Thus, in areas in which transparent display electrodes 20 are disposed, the phase plate is sandwiched between the first polarizing plate 17 and the transparent display electrodes 20. In addition to the layers provided on the display side glass substrate 13, a second polarizing plate 18, an adhesive member 19 and a plate-like reflection member 1 are sequentially provided on the outer side of the backside glass substrate 14. As in the prior art, the terms inside (or inner side) and outside (or outer side) have been used here to denote sides of layers more proximate and more distal, respectfully, to the liquid crystal layer 15.

The reflection member 1 is disposed on the outer side of the second polarizing plate 18 such that the surface of the reflection member 1 on which protrusions and recesses are formed is more proximate to the second polarizing plate 18. The space between the reflection member 1 and the second polarizing plate 18 is filled with an adhesive member 19 consisting of a material, such as glycerine, which does not adversely affect the refractive index of light.

Figure 2:
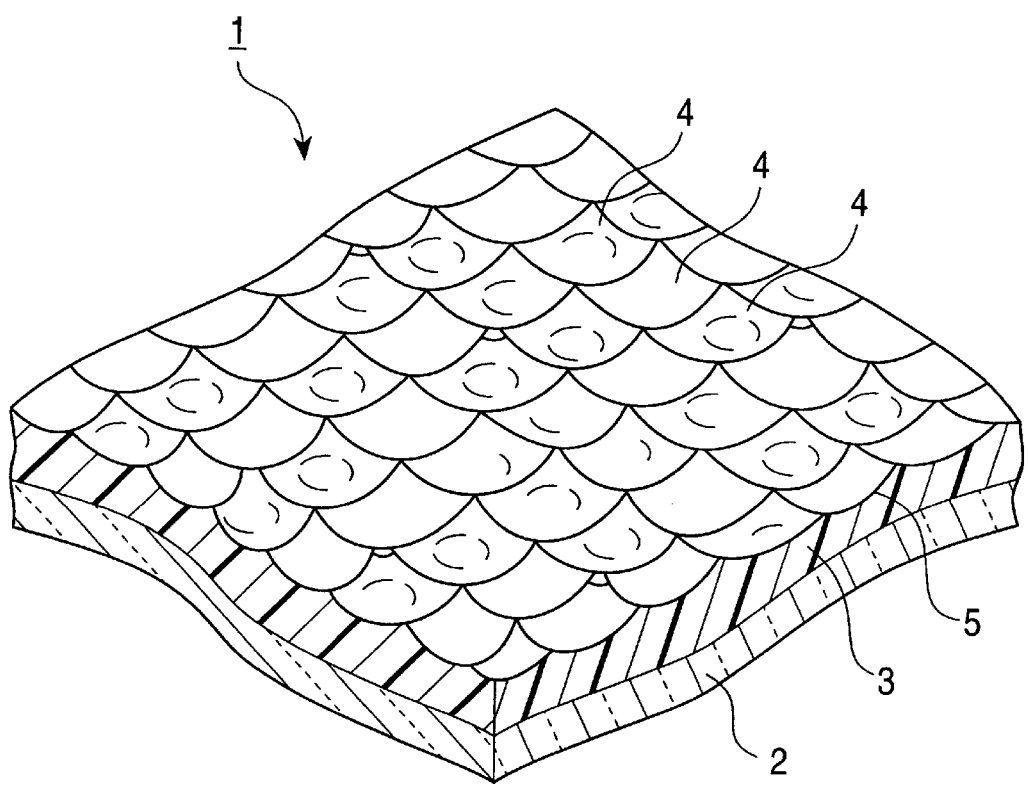
FIG. 2 is a perspective view showing a part of the reflection member shown in FIG. 1.

As shown in FIG. 2, the reflection member 1 comprises a substrate 2 consisting of a transparent material, i.e. glass or a similar material. A flat resin base 3 (reflection member base) consisting of a photosensitive resin or the like is provided on the substrate 2. A plurality of recesses 4, the inner surfaces of which constitute part of spherical surfaces, are continuously and overlappingly formed on the surface of the resin base 3. Thereon, a reflection film 5 consisting of a thin film of reflecting material such as aluminum, silver or the like is formed. Methods by which the reflecting film may be formed include, but are not limited to, evaporation or printing.

In the first embodiment, the depth of the recesses 4 is random in the range of 0.1 to 3 $\mu$m. In addition, the adjacent recesses 4 are arranged having a pitch randomly provided in the range of 5 to 50 $\mu$m. The inclination angle of the inner surfaces of the recesses 4 is set in the range of −35 degrees to +35 degrees. This is not to say that these ranges are all determinative. Alternate embodiments may provide recesses with randomly provided depths and/or pitches outside of the ranges proscribed in the first embodiment. In addition, the inclination angle of the inner surfaces may be altered to include angles outside of the −35 degrees to +35 degrees range either with or without recesses having random depths and/or pitches outside of these ranges.

The reflection member 1 is produced in a first method as shown in FIGS. 3 through 7.

Figure 3A:
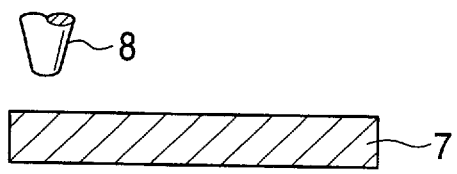
FIGS. 3A through 3F are process diagrams showing the process for producing the reflection member shown in FIG. 1.
Figure 3B:
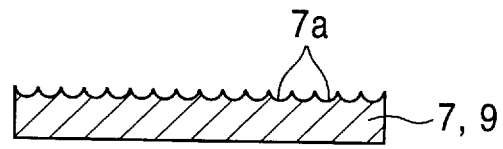

First, as shown in FIG. 3(a), a mother base material 7 of brass, stainless steel or tool steel, for example, and which has a flat surface to be machined is secured on a table of a rolling machine. A diamond indenter 8, whose forward end has a spherical configuration with a predetermined diameter R, subsequently depresses the surface of the mother base material 7. The mother base material 7 is horizontally moved and the diamond indenter 8 again depresses the surface of the mother base material 7. This operation is repeated a plurality of times, and thus, by rolling on the surface of the mother base material 7, a plurality of recesses 7a whose depths and arrangement pitches differ are formed, creating the reflection member base 9 as shown in FIG. 3(b). In the rolling apparatus used, the table for securing the mother base material 7 in position moves in the horizontal X and Y-directions with a resolution of 0.1 $\mu$m, and the diamond indenter 8 moves in the vertical direction (Z-direction) with a resolution of 1 $\mu$m. In the first embodiment, the diameter R of the forward end of the diamond indenter 8 can be approximately 10 to 100 $\mu$m. However, in alternate embodiments, the resolution of movement of the rolling apparatus and that of the diamond indenter 8 (as well as the diameter of the forward end) may vary outside of this range as desired. For example, in the first embodiment, when the depth of the recesses 7a is approximately 2 $\mu$m, the diameter R of the forward end of the indenter may be 30 to 50 $\mu$m, and when the depth of the recesses 7a is approximately 1 $\mu$m, the diameter R of the forward end of the indenter may be 50 to 100 $\mu$m.

The diamond indenter rolling procedure is illustrated by the following description.

Figure 5:
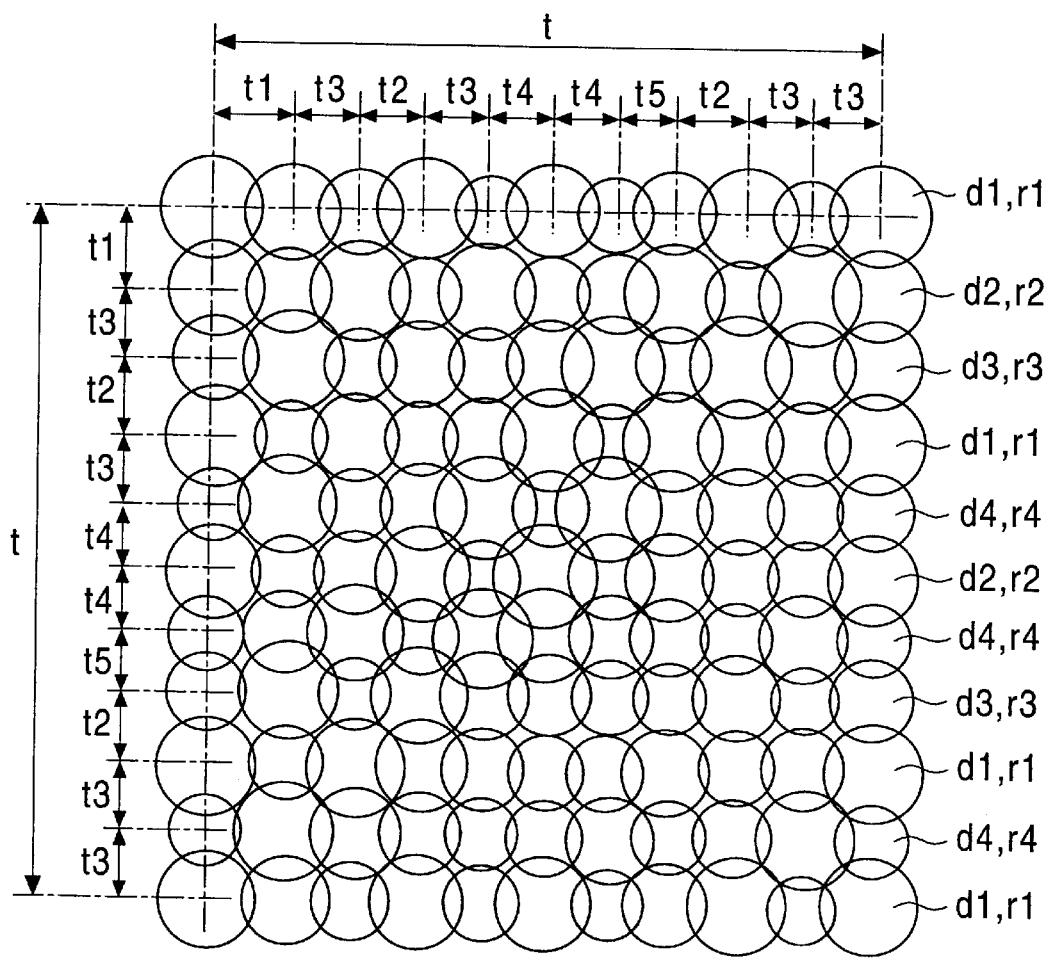
FIG. 5 is a plan view of a pattern in which the mother base material is depressed by the diamond indenter shown in FIG. 4.

As shown in the plan view of the rolling pattern, FIG. 5, the pitches of the laterally adjacent recesses are from the left are t1 (=17 $\mu$m), t3 (=15 $\mu$m), t2 (=16 $\mu$m), t3, t4 (=14 $\mu$m), t4, t5 (=13 $\mu$m), t2, t3, t3. The pitches of vertically adjacent recesses from above are similar to the above pattern. Four depths in the range of 1.1 to 2.1 $\mu$m are subsequently set (indicated by d1, d2, d3 and d4 in the drawing) and depressions are effected. Four radii of the circular recesses result after depression: r1 (=11 $\mu$m), r2 (=10 $\mu$m), r3 (=9 $\mu$m) and r4 (=8 $\mu$m). For example, the depth radii in a longitudinal row are: r1, r2, r3, r1, r4, r2, r4, r3, r1, r4, r1 from above.

Figure 6:
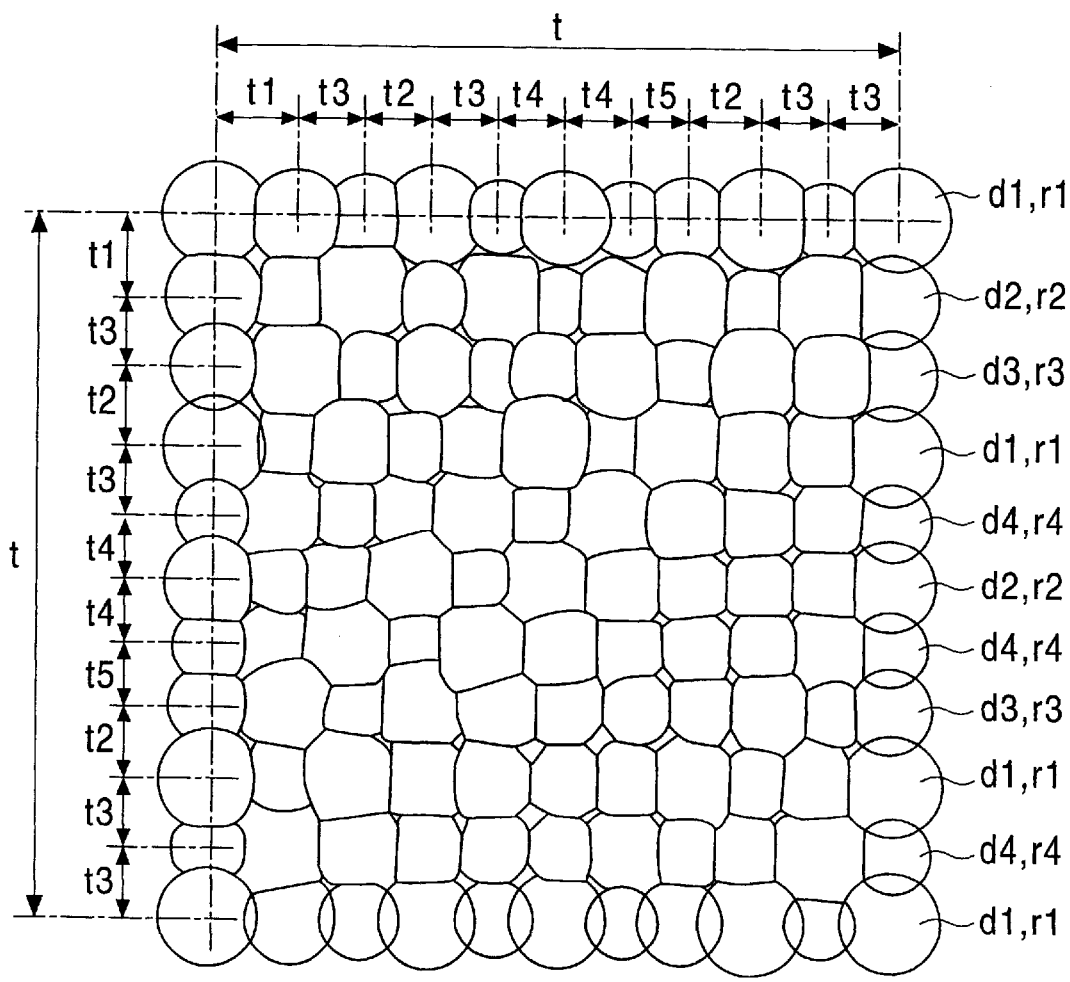
FIG. 6 is a plan view of all the recesses of the mother base material after the depression by the diamond indenter shown in FIG. 4.

Rather than form the recesses consecutively, recesses with the same sizes are formed at one time before moving to the next size recess. For example, the order of rolling in FIG. 5 could be, first forming all the recesses of the depth d1 in the uppermost horizontal row and then forming the recesses of the depth d2, the recesses of the depth d3 and the recesses of the depth d4, thus repeating the rolling operation for the four depths to form all the recesses in the uppermost lateral row. After this, a similar operation may be conducted on the subsequent horizontal rows, thus forming all the recesses in the pattern. FIG. 5 shows a rolling pattern of t=150 $\mu$m square, the entire reflection member being formed by repeating this pattern. As shown in FIG. 5, the adjacent depression recesses may partly overlap each other, so that the plan view configuration of all the recesses after the completion of the rolling operation is as shown in FIG. 6.

Figure 3C:
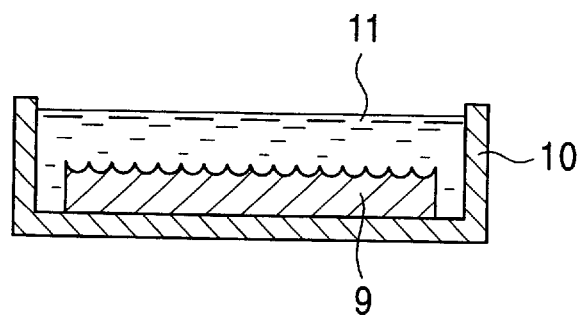
Figure 3D:
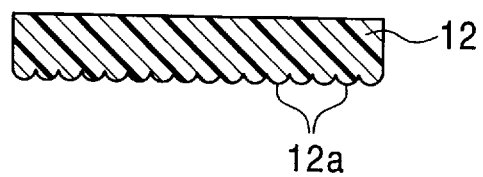

After this, as shown in FIG. 3(c), the mother pattern 9 is accommodated and arranged in a box-like container 10, and a resin material 11 such as silicone is poured into the container 10. The resin material is allowed to stand at room temperature to cure. The cured resin product is extracted from the container 10 and the unnecessary portion thereof is removed, whereby, as shown in FIG. 3(d), a transfer pattern 12 is formed. The transfer pattern includes a pattern surface 12a having a plurality of protrusions of a configuration corresponding (inversely) to the plurality of recesses constituting the pattern surface of the mother pattern 9.

Next, a photosensitive resin liquid such as acrylic type resist, polystyrenene type resist, azide rubber type resist, or imide type resist, is applied to the upper surface of the glass substrate by spin coating, screen printing, spraying, or other comparable methods. The coated substrate is then pre-baked, in which the photosensitive resin liquid on the substrate is heated for more than one minute in a temperature range, for example, of 80 to 100° C. by using a heating device such as a heating furnace or a hot plate, to thereby form a photosensitive resin layer on the substrate. However, as pre-baking conditions differ depending on the type of photosensitive resin used, the pre-baking time and temperature may vary outside the above-mentioned ranges. In the first embodiment, the thickness of the photosensitive resin layer may be 2 to 5 $\mu$m.

Figure 3E:
Figure 3F:
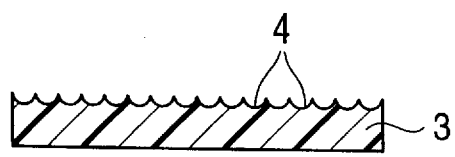
Figure 4:
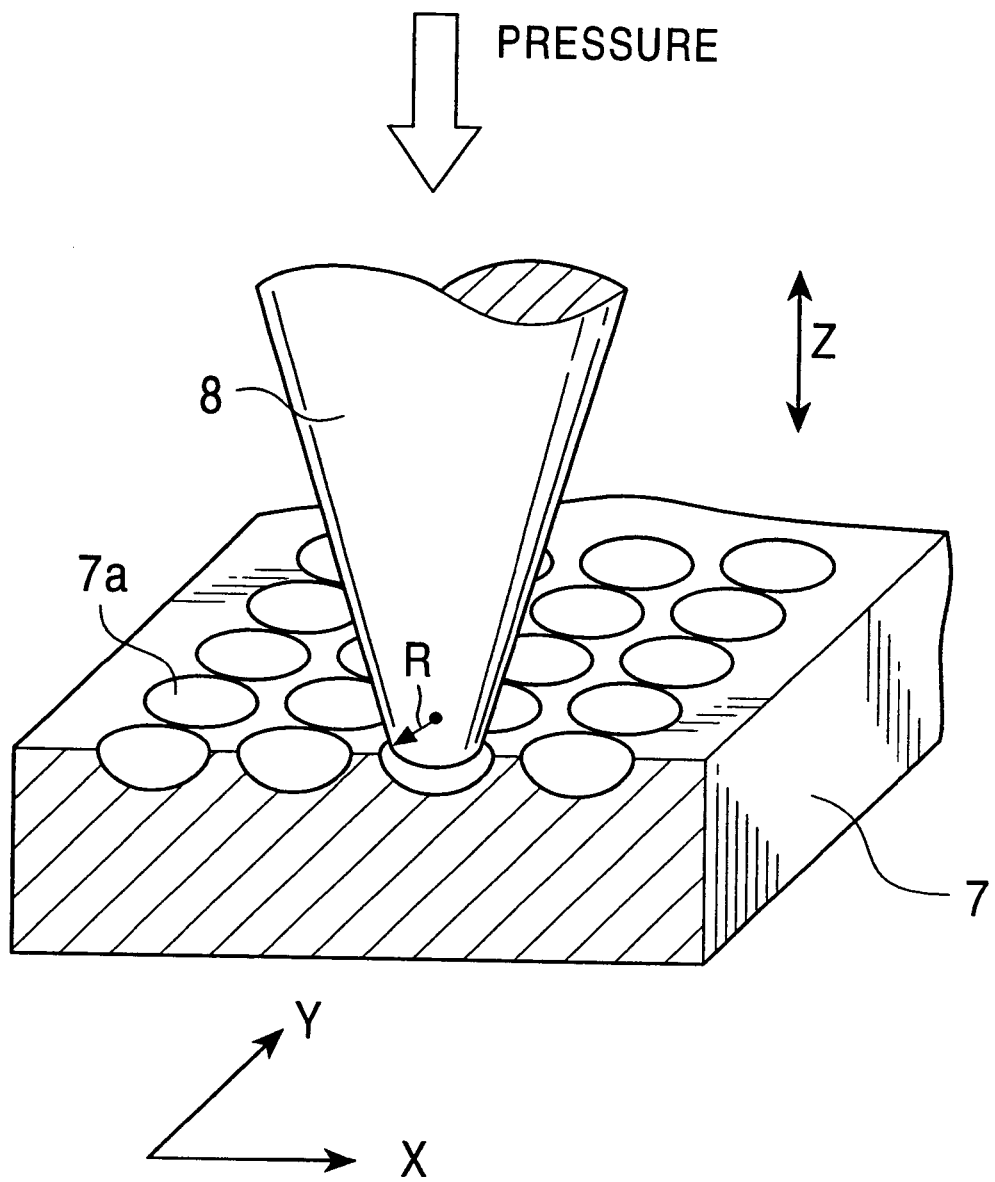
FIG. 4 is a diagram showing the process for producing the mother pattern for producing the reflection member shown in FIG. 3, showing the mother base material being depressed by a diamond indenter.

After pre-baking, by using the transfer pattern 12 shown in FIG. 3(d), the pattern surface 12a of the transfer pattern 12 is pressed against the photosensitive resin layer 3 on the glass substrate for a fixed period of time, as shown in FIG. 3(e). The transfer pattern 12 is then detached from the photosensitive resin layer 3, transferring the protrusions of the transfer pattern surface 12a to the surface of the photosensitive resin layer 3 to form the plurality of recesses 4, as shown in FIG. 3(f). Both the pressure applied and the time of application during pattern pressing is selected depending on the type of photosensitive resin used; for example, a pressure of approximately 30 to 50 kg/cm² and time of approximately 30 seconds to 10 minutes may be used depending on the resin.

After the pre-bake, ultraviolet (g, h, or i-line) radiation or similar high-energy radiation is applied through the backside of the transparent glass substrate to cure the photosensitive resin layer 3. Using the above-mentioned types of photosensitive resins, a radiation intensity of at least 50 mJ/cm² is required to cure the photosensitive resin layer, however as above, the intensity necessary varies depending on the type of photosensitive resin layer present.

The photosensitive resin layer is next post baked by using a heating device such as a heating furnace or hot plate. The heating device may be the same as that used in the pre-baking, or separate heating devices may be used for both pre-bake and post bake. During post bake, the photosensitive resin layer 3 on the glass substrate 3 is heated for at least one minute at approximately 240° C. to bake the photosensitive resin layer 3 on the glass substrate. Again, the temperature and length of the post bake varies depending on the photosensitive resin layer used.

Finally, a film of aluminum or other similar materials is formed on the surface of the photosensitive resin layer 3 to create a reflection film 5 along the surface of the recess. The aluminum is deposited by electron beam evaporation or other similar methods well known in the art, thereby completing the reflection member 1.

Figure 7:
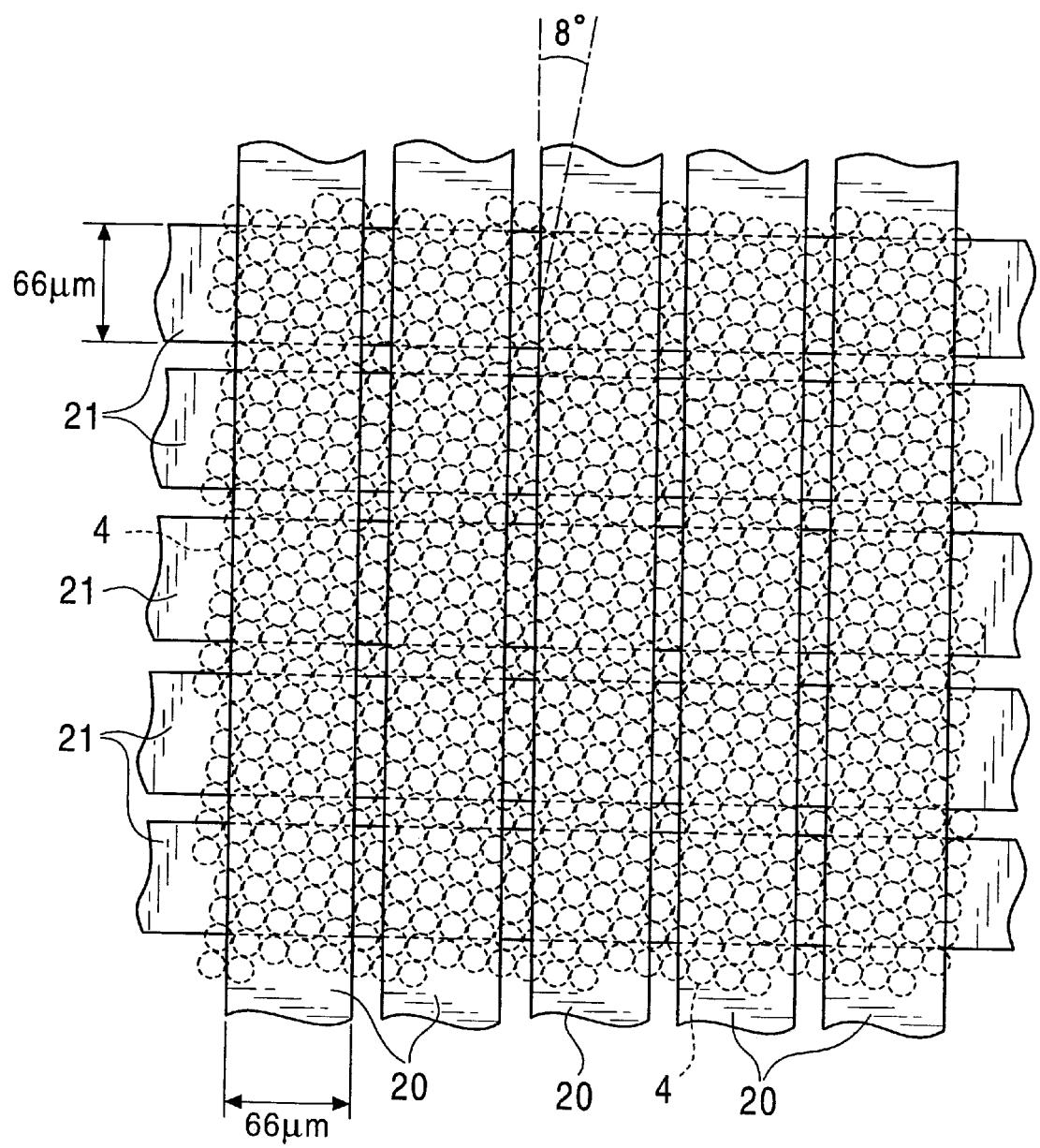
FIG. 7 is a plan view showing the arrangement relationship between the transparent electrodes and the plurality of rows of recesses of the reflection member shown in FIG. 1.

As shown in FIG. 7, the transparent electrodes 20 and 21 have a stripe-like pattern in which the pitch of the adjacent row of recesses in the reflection member 1 is 10 to 20 µm, giving a vertical pitch of, say, 76 µm for a width of 66 µm. The rows of recesses 4 of the reflection member 1 are arranged such that they are at an angle of 8 degrees with respect to the direction in which the stripe-like transparent electrodes 20 extend. In FIG. 7, this condition corresponds to the arrangement in which p1 (the pitch of adjacent recesses)=15 µm, θ=8 degrees.

In this case, the moiré fringe generated as a result of the reflection member 1 and the transparent electrodes 20 being superimposed is not easily viewed because the pitch of the moiré fringe is approximately 1.07 µm. In addition, if an angular deviation of 0.5 degrees occurs, the change in the pitch of the moiré fringe generated as a result of the superposition is approximately 7 µm, thus causing only a small change in the pitch.

Alternate embodiments of the reflection type liquid crystal display device of the present invention may include the reflection member 1 being formed on a different surface. For example, instead of providing the reflection member 1 outside the lower substrate 14 as in the above-described embodiment, the reflection member 1 may be directly formed on the outside surface of the lower substrate 14. In this case, if the stripe electrodes 20 and 21 and the reflection member 1 are the same as those used in the first embodiment, the direction in which the stripe-like electrodes 20 extend intersects the rows of recesses 4 of the reflection member 1 at an angle of 8 degrees as shown before, in FIG. 7. Note that although the electrodes and color filters are illustrated as stripe-like, all that is required to decrease the oblique moiré fringe is that the directions must be approximately between this angular range. Thus, the electrode (or color filter) need not be stripe-like, but may be arced, curved, bent, zig-zagged, or generally varied in any manner as long as the shape reduces the viewable oblique moiré fringe.

Next, another embodiment in which the present invention is applied to a reflection type color liquid crystal display device will be described with reference to FIG. 8. The basic construction of this embodiment is the same as that of the above-described reflection type liquid crystal display device.

Figure 8:
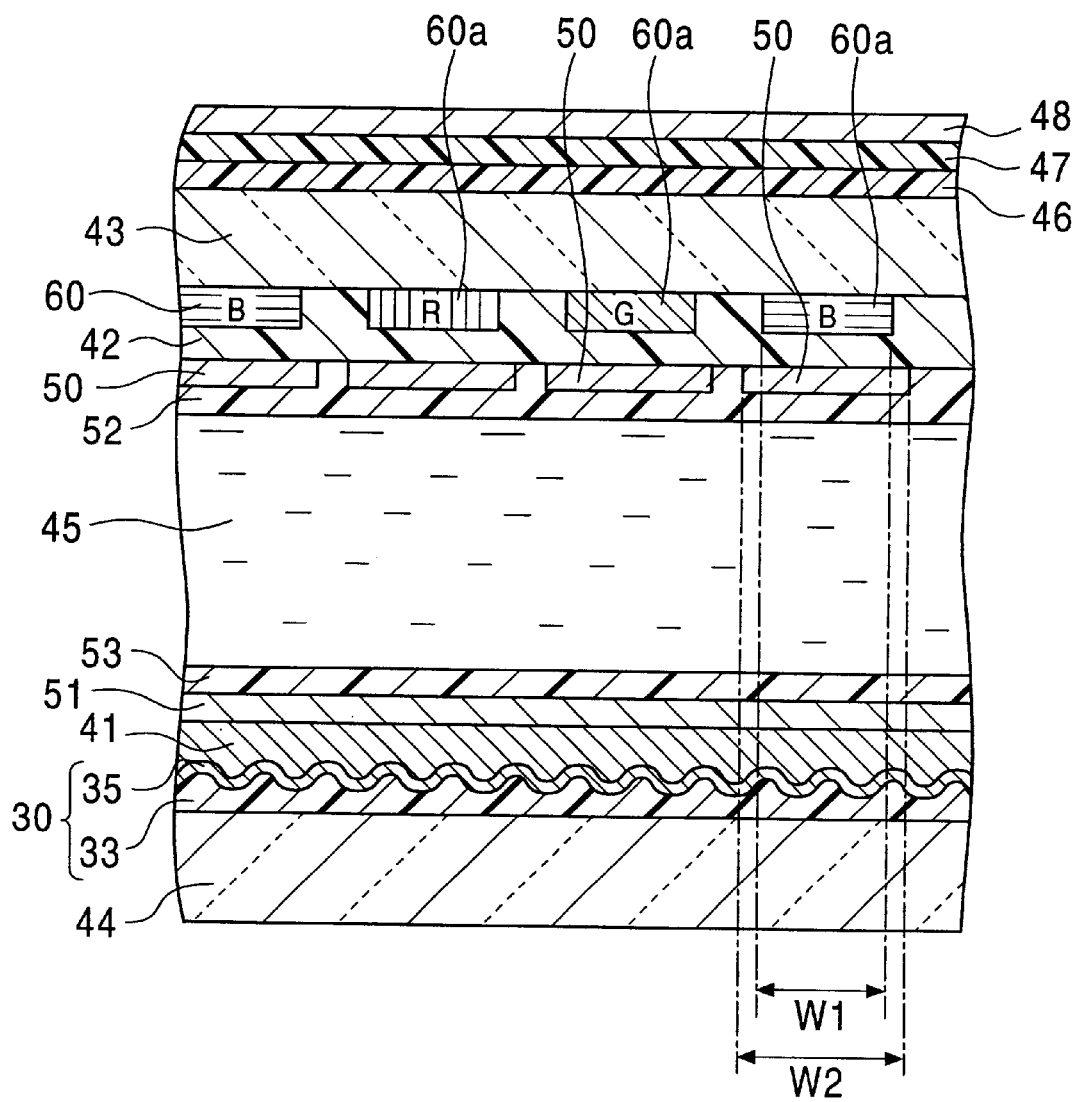
FIG. 8 is a sectional view showing another embodiment in which the present invention is applied to a reflection type color liquid crystal display device.

As shown in FIG. 8, in this liquid crystal display device contains upper and lower opposed glass substrates 43 and 44. A resin layer 33 having a plurality of protrusions and recesses is provided on the inner surface of the lower glass substrate 44. A reflection film 35, consisting of a metal such as aluminum, is provided on the resin layer 33, the resin layer 33 and the reflection film 35 comprising a reflection member 30. A flattening layer 41 is provided on the reflection film 35, a plurality of stripe-like lower transparent electrodes 51 consisting of indium tin oxide (hereinafter referred to as ITO) are provided on the flattening layer 41 and an orientation film 53 is provided on the stripe-like lower transparent electrodes 51.

Similarly, color filter layers 60 an overcoat layer 42, a plurality of stripe-like upper transparent electrodes 50 consisting of ITO, and an orientation film 52 are respectively provided on the inner surface of the upper glass substrate 43. An STN liquid crystal layer 45 is sealed between the orientation films 52 and 53 of the upper and lower glass substrates 43 and 44. In addition, a first phase plate 46, a second phase plate 47 and a polarizing plate 48 are sequentially provided outside the upper glass substrate 43.

The plurality of lower transparent electrodes 51 extend laterally in FIG. 8 and are arranged adjacent to each other at predetermined intervals. The plurality of upper transparent electrodes 20 extend in a direction in which they pass through the plane of FIG. 1, and are arranged adjacent to each other at predetermined distances. The inter-electrode pitch of these upper and lower transparent electrodes 50 and 51 and the shorter side width of each electrode are the same as those of the electrodes 20 and 21 shown in FIG. 1.

The color filters 60 consist of a plurality of elongated rectangular colored pixels 60a formed in correspondence with the upper transparent electrodes 50. The arrangement of the colored pixels 60a of the color filters 60 is such that the colored pixels 60a are arranged alternately longitudinally or laterally in a stripe-like manner in the order of red (R), green (G) and blue (B). Note that alternate orderings may be used as long as the three colors are represented equally in a set of three, e.g. GRB may be used instead of RGB.

The shorter side width W1 of each colored pixel 60a is not less than 80% of the shorter side width W2 of the corresponding upper transparent electrode 50. This is because a reduction in chromaticity occurs causing the color display quality to deteriorate when the shorter side width of each colored pixel 60a is less than 80% of the shorter side width of the corresponding upper transparent electrode 50. In addition, the upper transparent electrodes 50 are provided so as not to overlap adjacent colored pixels. The reason behind this is that when the upper transparent electrodes 50 overlap adjacent colored pixels, a step is generated in the region of overlap. This causes unevenness in orientation and results in a deterioration of the display quality.

The reflection member 30 has a similar construction to that of the reflection member 1 shown in FIG. 2 (excluding the substrate 2). That is, the resin layer 33 corresponds to the resin layer 3 in FIG. 2 and the reflection film 35 corresponds to the reflection film 5 in FIG. 2. Thus, as shown in FIG. 9, the recesses 34 in reflection member 30 are similar to the recesses 4 shown in FIGS. 2 and 6.

Figure 9:
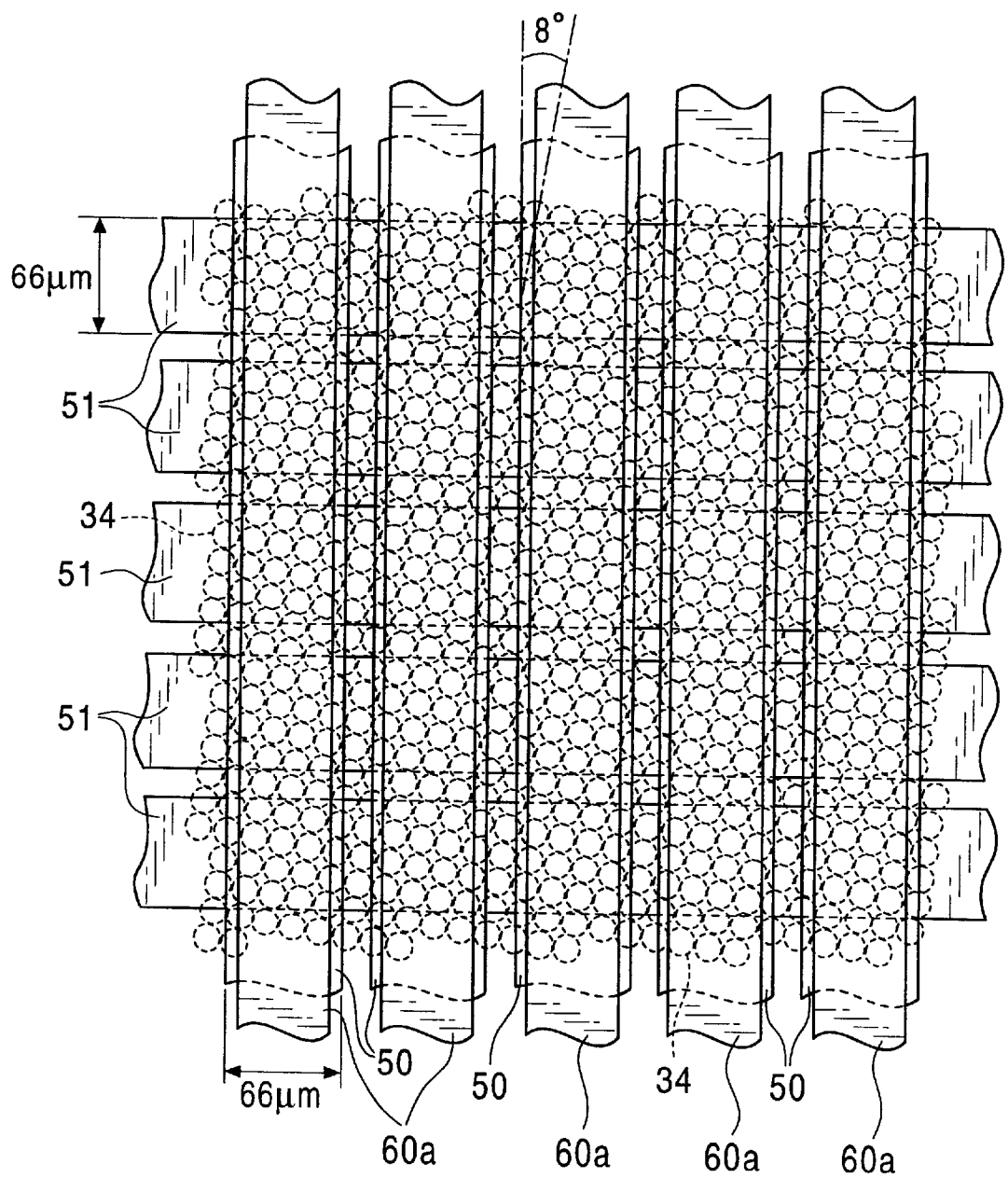
FIG. 9 is a plan view showing the arrangement relationship between the transparent electrodes, the colored pixels of the color filters and the plurality of rows of recesses of the reflection member shown in FIG. 8.
Figure 10:
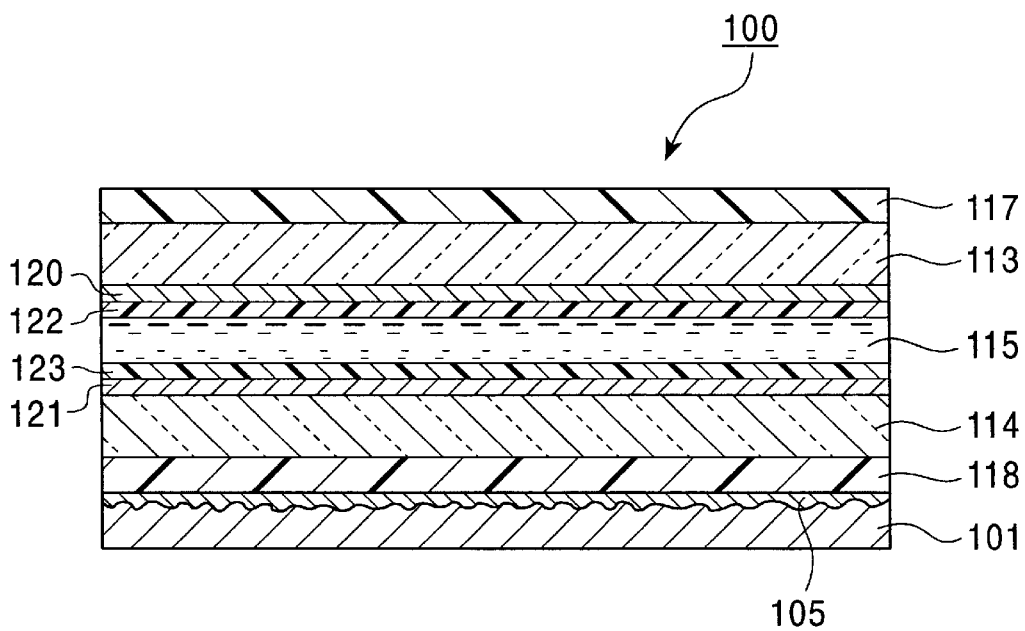
FIG. 10 is a sectional view showing a conventional reflection type liquid crystal display device.

Similarly, in the embodiment shown in FIG. 9, the recesses 34 of the reflection member 30 are arranged in a direction 8 degrees off with respect to the direction in which the stripe-like transparent electrodes 50 extend. Similarly, the rows of recesses 34 of the reflection member 30 are arranged a direction 8 degrees off with respect to the direction in which the colored pixels 60a of the color filters are arranged. The pitch of the moiré fringe generated as a result of superimposing the reflection member 30, the transparent electrodes 50 and the colored pixels 60a is again approximately 1.07 μm, and as a result, the viewable moiré fringe is decreased.

As in the first embodiment, in the reflection type color liquid crystal display device of the present invention, the reflection member 30 may be provided on the outer side of the lower substrate 44 instead of providing it on the inner side thereof. In addition, instead of providing the providing the color filters 60 on the upper substrate 43 side of the liquid crystal, they may be provided on the lower substrate 44 side of the liquid crystal. For example, the color filters 60 and the overcoat layer 42 may be sequentially provided on the reflection member 30. In this case the flattening layer 41 may be omitted.

Furthermore, the reflection member of the present invention (in either embodiment) is applicable not only to an STN (super twisted nematic) type but also to a TN (twisted nematic) type liquid crystal display device, for example, a TFT type liquid crystal display device.

As described above, in the liquid crystal display device of the present invention, the direction in which the stripe-like display electrodes extend may deviate about 2.5 to about 40 degrees from the direction in which the recesses of the reflection member are repeatedly arranged. This angular deviation results in the moiré fringe being less prominent and a bright, high quality display being obtained. By varying both the depth of the recesses and the pitch of the adjacent recesses of the reflection plate within preset ranges, a reduction in interference of light results, leading to an enhancement of the reflection efficiency in all directions and a further increase the display quality.

In addition, in the reflection type color liquid crystal display device of the present invention, the direction in which the colored pixels of the color filters are arranged may deviate about 2.5 to about 40 degrees from the direction in which the recesses of the reflection member are repeatedly arranged. This also results in the moiré fringe being less noticeable and a bright, high quality display being obtained. As above, the variation of both the depth of the recesses and the pitch of the adjacent recesses of the reflection plate within predetermined ranges results in a reduction in interference of light results, leading to an enhancement of the reflection efficiency in all directions and a further increase the display quality.

This application herein claims priority from and incorporates by reference Japanese Patent Application No. 11-105868, filed Apr. 13, 1999.

While the invention has been described with reference to specific embodiments, the description is illustrative of the invention and not to be construed as limiting the invention. Various modifications and applications may occur to those skilled in the art without departing from the true spirit and scope of the invention as defined in the appended claims.

What is claimed is:

1. A reflection type liquid crystal display device comprising:
    an upper and a lower substrate;
    a liquid crystal layer provided between the upper and lower substrates, the upper and lower substrates each having an inner side more proximate to the liquid crystal layer and an outer side more distal to the liquid crystal layer;
    a plurality of transparent electrodes formed on at least one of the inner side of the upper and lower substrates, the plurality of transparent electrodes extending in a first predetermined direction; and
    a reflection member disposed on one of the inner and outer side of the lower substrate, the reflection member having a plurality of recesses arranged in a second predetermined direction;
    wherein the first and second predetermined directions deviate about 2.5 to about 40 degrees from each other when extending along planes substantially parallel with each other.

2. A reflection type liquid crystal display device according to claim 1, wherein each recess in the plurality of recesses has an inner surface formed at least partially spherically and formed continuously such that the recesses overlap each other, a depth of the recesses and a pitch of adjacent recesses vary within predetermined ranges.

3. A reflection type liquid crystal display device according to claim 1, wherein one of a STN and TFT system is adopted, the reflection member is provided on the inner side of the lower substrate, and a polarizing plate is provided on the upper substrate.

4. A reflection type liquid crystal display device comprising:
    an upper and a lower substrate,
    a liquid crystal layer provided between the upper and lower substrates, the upper and lower substrates having an inner side more proximate to the liquid crystal layer and an outer side more distal to the liquid crystal layer;
    a plurality of transparent electrodes formed on at least one of the inner side of the upper and lower substrates, the plurality of transparent electrodes extending in a first predetermined direction;
    color filters provided on one of the inner sides of the upper and lower substrates and having a plurality of colored pixels aligned in a second predetermined direction; and
    a reflection member disposed on one of the inner and outer sides of the lower substrate, the reflection member having a plurality of recesses arranged in a third predetermined direction;
    wherein the third and second predetermined directions deviate about 2.5 to about 40 degrees from each other when extending along planes substantially parallel with each other.

5. A reflection type liquid crystal display device according to claim 4, wherein each recess has an inner surface formed at least partially spherically and formed continuously such that the recesses overlap each other, a depth of the recesses and a pitch of adjacent recesses vary within predetermined ranges.

6. A reflection type liquid crystal display device according to claim 4, wherein one of a STN and TFT system is adopted, the reflection member is provided on the inner side of the lower substrate, the color filters are provided on the reflection member, and a polarizing plate is provided on the upper substrate.

7. A reflection type liquid crystal display device comprising:

a pair of substrates;

a liquid crystal layer disposed between the pair of substrates, each substrate having an inner side more proximate to the liquid crystal layer and an outer side more distal to the liquid crystal layer;

a plurality of transparent electrodes formed in parallel directions at predetermined intervals on inner sides of each of the pair of substrates, the plurality of transparent electrodes formed in a first parallel direction on one substrate of the pair of substrates and the plurality of transparent electrodes formed in a second parallel direction on the other substrate of the pair of substrates, the first parallel direction orthogonal to the second parallel direction; and a reflection member provided on one of the inner and outer sides of one of the substrates, the reflection member having a plurality of recesses continuously arranged in two mutually orthogonal directions, one of the two mutually orthogonal directions deviating about 2.5 to about 40 degrees from the first parallel direction and the other of the two mutually orthogonal directions deviating about 2.5 to about 40 degrees from the second parallel direction when extending along planes substantially parallel with each other.

8. A reflection type liquid crystal display device comprising:

a pair of substrates;

a liquid crystal layer disposed between the pair of substrates, each substrate having an inner side more proximate to the liquid crystal layer and an outer side more distal to the liquid crystal layer;

a plurality of transparent electrodes formed in parallel directions at predetermined intervals on inner sides of each of the pair of substrates, the parallel direction on a first substrate of the pair of substrates orthogonal to the parallel direction on a second substrate of the pair of substrates;

color filters provided on the inner side of one of the substrates and having a plurality of colored pixels aligned along one of the two parallel directions; and a reflection member provided on one of the inner and outer side of one of the substrates, the reflection member having a plurality of recesses arranged in two predetermined directions;

wherein the parallel direction of the first substrate and one of the predetermined directions deviate about 2.5 to about 40 degrees from each other and the parallel direction of the second substrate and the other of the predetermined directions deviate about 2.5 to about 40 degrees from each other when extending along planes substantially parallel with each other.

9. A method of producing a reflection type liquid crystal display device comprising:

providing an upper and a lower substrate;

providing a liquid crystal layer disposed between the upper and lower substrates, the upper and lower substrates each having an inner side more proximate to the liquid crystal layer and an outer side more distal to the liquid crystal layer forming a plurality of transparent electrodes on at least one of the inner side of the upper and lower substrates, the plurality of transparent electrodes extending in a first predetermined direction; and forming a reflection member disposed on one of the inner and outer side of the lower substrate, the reflection member having a plurality of recesses arranged in a second predetermined direction deviating about 2.5 to about 40 degrees from the first predetermined direction when extending along planes substantially parallel with each other.

10. The method claim 9, further comprising providing color filters on the inner side of one of the substrates and having a plurality of colored pixels aligned in a third predetermined direction.

* * * * *

UNITED STATES PATENT AND TRADEMARK OFFICE
CERTIFICATE OF CORRECTION

PATENT NO. : 6,686,982 B1
DATED : February 3, 2004
INVENTOR(S) : Katsumasa Yoshii It is certified that error appears in the above-identified patent and that said Letters Patent is hereby corrected as shown below:

<u>Column 12,</u>
Line 39, immediately after "substrate" delete "," (comma) and substitute -- ; -- (semicolon) in its place.

<u>Column 14,</u>
Line 24, immediately after "crystal layer" insert -- ; -- (semicolon).

Signed and Sealed this

Thirteenth Day of July, 2004

JON W. DUDAS
*Acting Director of the United States Patent and Trademark Office*